(12) United States Patent
Yang et al.

(10) Patent No.: US 10,015,075 B1
(45) Date of Patent: Jul. 3, 2018

(54) DIRECTED ACYCLIC GRAPH OPTIMIZATION FOR FUTURE TIME INSTANCE ADVERTISED BY A PARENT NETWORK DEVICE

(71) Applicant: Cisco Technology, Inc., San Jose, CA (US)

(72) Inventors: Yi Yang, Cary, NC (US); Alvaro Enrique Retana, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/454,991

(22) Filed: Mar. 9, 2017

(51) Int. Cl.
H04W 84/18 (2009.01)
H04L 12/751 (2013.01)
H04L 12/44 (2006.01)

(52) U.S. Cl.
CPC ............ H04L 45/02 (2013.01); H04L 12/44 (2013.01); H04W 84/18 (2013.01)

(58) Field of Classification Search
CPC ......... H04L 29/08315; H04L 29/08324; H04L 29/08342; H04L 41/12; H04L 45/02; H04L 47/829; H04L 67/1042; H04L 67/1089; H04L 28/021; H04W 76/023; H04W 76/043
See application file for complete search history.

(56) References Cited

U.S. PATENT DOCUMENTS

| | | | |
|---|---|---|---|
| 7,428,221 B2 | 9/2008 | Thubert et al. | |
| 8,060,617 B2 | 11/2011 | Moon | |
| 8,407,340 B2* | 3/2013 | Zamora Cura | ... G06F 17/30902 382/113 |
| 9,166,880 B2 | 10/2015 | Shaffer et al. | |
| 9,510,347 B2 | 11/2016 | Thubert et al. | |
| 2012/0244902 A1* | 9/2012 | Saito | ...... H04W 84/20 455/517 |
| 2013/0208622 A1* | 8/2013 | Ibuki | ...... H04W 84/18 370/254 |
| 2013/0322299 A1* | 12/2013 | Choi | ...... H04L 12/462 370/256 |
| 2014/0204759 A1 | 7/2014 | Guo et al. | |

(Continued)

OTHER PUBLICATIONS

Winter et al., "RPL: IPv6 Routing Protocol for Low-Power and Lossy Networks", Internet Engineering Task Force (IETF), Request for Comments: 6550, Mar. 2012, pp. 1-157.

(Continued)

*Primary Examiner* — Robert M Morlan
(74) *Attorney, Agent, or Firm* — Leon R. Turkevich

(57) ABSTRACT

In one embodiment, a method comprises identifying, by a network device, a future time interval for establishment of a corresponding future tree-based topology that is to be optimized according to an identified objective function, the future tree-based topology and corresponding identified objective function distinct from a current tree-based topology optimized according to a corresponding current objective function; and generating and outputting, by the network device, a message advertising the network device offering availability of the future tree-based topology optimized at the future time interval for the identified objective function, enabling other network devices to attach to the network device during the future time interval for communications optimized according to the identified objective function.

20 Claims, 7 Drawing Sheets

(56) References Cited

U.S. PATENT DOCUMENTS

| | | |
|---|---|---|
| 2015/0200810 A1 | 7/2015 | Vasseur et al. |
| 2015/0200872 A1 | 7/2015 | Huang et al. |
| 2015/0236909 A1 | 8/2015 | Valluri et al. |
| 2016/0021006 A1 | 1/2016 | Vasseur et al. |
| 2016/0072697 A1 | 3/2016 | Thubert et al. |
| 2016/0174192 A1 | 6/2016 | Raghu et al. |
| 2016/0197829 A1 | 7/2016 | Thubert et al. |
| 2017/0353292 A1 | 12/2017 | Thubert et al. |

OTHER PUBLICATIONS

Vasseur, Ed , et al., "Routing Metrics Used for Path Calculation in Low-Power and Lossy Networks", Internet Engineering Task Force (IETF), Request for Comments: 6551, Mar. 2012, pp. 1-30.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Dejean et al., "Selective DIS for RPL", ROLL Working Group, Internet-Draft, [online], Mar. 7, 2011, [retrieved on Jun. 7, 2016]. Retrieved from the Internet: URL: <https://tools.ietf.org/pdf/draft-dejean-roll-selective-dis-00.pdf>, pp. 1-11.

Goyal et al., "DIS Modifications", Internet Engineering Task Force, Internet-Draft, [online], Oct. 12, 2012, [retrieved on Jun. 7, 2016]. Retrieved from the Internet: URL: < https://tools.ietf.org/html/draft-goyal-roll-dis-modifications-01>, pp. 1-10.

Thubert, Ed. et al., "An Architecture for IPv6 over the TSCH mode of IEEE 802.15 4e", 6TiSCH, Internet-Draft, [online], Oct. 27, 2014, [retrieved on Dec. 11, 2015]. Retrieved from the Internet: URL: <https://tools.ietf.org/pdf/draft-ietf-6tisch-architecture-04.pdf>, pp. 1-32.

Zhong, Ed. et al., "DIS Modifications", Internet Engineering Task Force, Internet-Draft, [online], Nov. 4, 2015, [retrieved on Jun. 7, 2016]. Retrieved from the Internet: URL: <https://tools.ieff.org/html/draft-zhong-roll-dis-modifications>, pp. 1-14.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Vasseur, "Terms Used in Routing for Low-Power and Lossy Networks", Internet Engineering Task Force (IETF), Request for Comments: 7102, Jan. 2014, pp. 1-8.

Lohmann, "Wireless Introduction", Hart Communication Foundation, HCF_LIT-131, [online], Mar. 1, 2010, [retrieved on Jan. 29, 2013]. Retrieved from the Internet: URL:<http://www.hcf-files.com/webasyst/published/DD/html/scripts/getfolderfile_zoho.php?DL_ID=MTA5NQ%3D%3D&ID=72a7beb0a6eeba6aaf06ef19e00ce258&DB_KEY=V0VCRkIMRVM%3D>, pp. 1-11.

Thubert et al., U.S. Appl. No. 15/171,518, filed Jun. 2, 2016.

Yang et al., U.S. Appl. No. 15/190,798, filed Jun. 23, 2016.

\* cited by examiner

DIRECTED ACYCLIC GRAPH OPTIMIZATION FOR FUTURE TIME INSTANCE ADVERTISED BY A PARENT NETWORK DEVICE

TECHNICAL FIELD

The present disclosure generally relates to directed acyclic graph optimization for a future time instance advertised by a parent network device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function specified in the DIO for the RPL instance. The "child" network device, upon attaching to its parent, can output its own DIO with updated network topology metrics that enable other network devices to discover the DODAG, learn the updated network topology metrics, and select a DODAG parent based on the objective function specified in the DIO for attachment to the DODAG.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
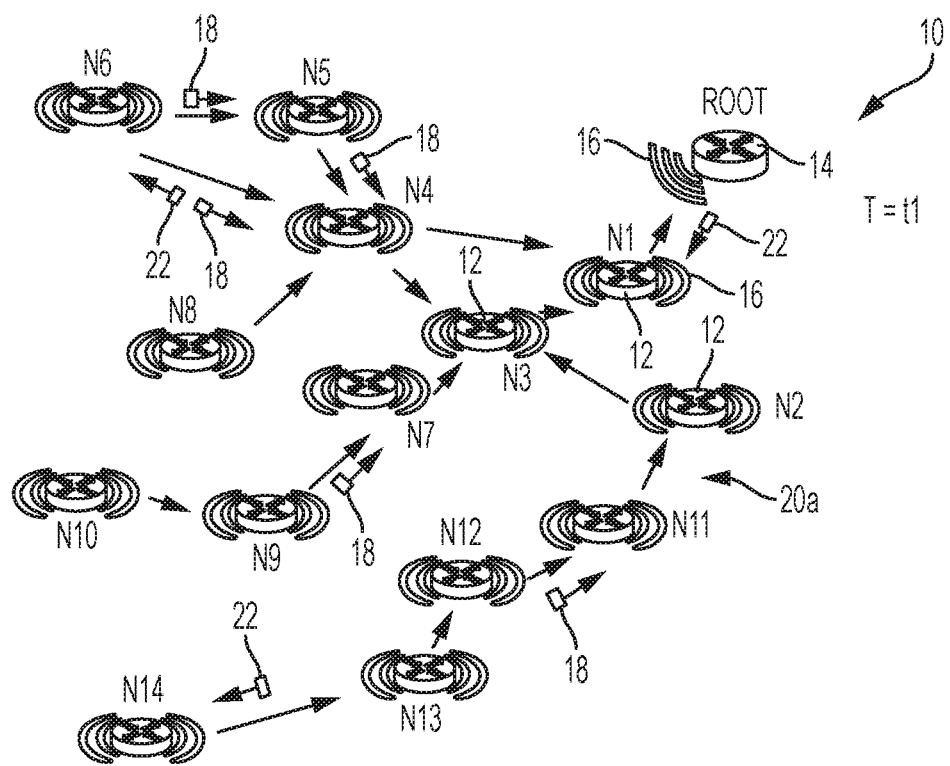
FIGS. 1A-1C illustrate an example system having an apparatus configured for advertising generation of a tree-based topology that is optimized for a future time instance selected by the apparatus, according to an example embodiment.

In one embodiment, a method comprises identifying, by a network device, a future time interval for establishment of a corresponding future tree-based topology that is to be optimized according to an identified objective function, the future tree-based topology and corresponding identified objective function distinct from a current tree-based topology optimized according to a corresponding current objective function; and generating and outputting, by the network device, a message advertising the network device offering availability of the future tree-based topology optimized at the future time interval for the identified objective function, enabling other network devices to attach to the network device during the future time interval for communications optimized according to the identified objective function.

In another embodiment, an apparatus comprises a processor circuit and a device interface circuit. The processor circuit is configured for identifying a future time interval for establishment of a corresponding future tree-based topology that is to be optimized according to an identified objective function. The future tree-based topology and corresponding identified objective function are distinct from a current tree-based topology optimized according to a corresponding current objective function. The processor circuit further is configured for generating a message advertising the apparatus offering availability of the future tree-based topology optimized at the future time interval for the identified objective function. The device interface circuit is configured for outputting the message into a data network, the message enabling other network devices to attach to the apparatus during the future time interval for communications optimized according to the identified objective function.

In another embodiment, one or more non-transitory tangible media are encoded with logic for execution by a machine and when executed by the machine operable for: identifying, by the machine implemented as a network device, a future time interval for establishment of a corresponding future tree-based topology that is to be optimized according to an identified objective function, the future tree-based topology and corresponding identified objective function distinct from a current tree-based topology optimized according to a corresponding current objective function; and generating and outputting, by the network device, a message advertising the network device offering availability of the future tree-based topology optimized at the future time interval for the identified objective function, enabling other network devices to attach to the network device during the future time interval for communications optimized according to the identified objective function.

DETAILED DESCRIPTION

Particular embodiments enable a network device to advertise an availability of a future tree-based topology that will be offered by the network device at a future time interval, and wherein the future tree-based topology is to be optimized at the future time interval according to an objective function selected by the network device (also referred to herein as the "advertising network device"). The advertising network device can be deployed as a root network device providing a current tree-based topology according to a current objective function; the advertising network device also can be implemented as a child network device having attached to a parent network device in the current tree-based topology rooted by a current root network device. Further, the advertising network device can advertise the availability of the future tree-based topology either as the root of the future tree-based topology, or as a child device that is to be attached to another parent network device within the future tree-based topology.

Hence, example embodiments enable the advertising network device to generate and output an offer advertisement message that advertises one or more "offers" of future tree-based topologies, each "offer" specifying the corresponding future time interval and the corresponding objective function that will be used to generate the future tree-based topology for the future time interval. Each tree-based topology offered by the advertising network device can be at least a portion of a directed acyclic graph (DAG) of a data network; further, the "offers" can specify overlapping and/or distinct future time intervals, depending on the capabilities of the network device.

Hence, other network devices receiving the offer advertisement message via the current tree-based topology (also referred to herein as "receiving network devices") can independently choose whether to attach to the advertising network device for optimized communications at any time during the offered future time intervals. The use of offer advertisement messages enables the receiving network devices to independently control their respective resource management operations, including independent selection of low-power idle intervals, independent selection of attaching to the advertising network device at any time during the offered future time intervals, and active transmission at any time within the offered future time intervals, without the necessity of any assignment of a transmission timeslot by a management entity (e.g., as in a time-slotted deterministic network) that otherwise would force a receiving network device to synchronize to the transmission timeslot.

Hence, the independent selection of future tree-based topologies offered at respective future time intervals enables low-power receiving network devices, for example Internet of Things (IoT) based devices having constrained resources, to minimize power consumption based on maintaining a low-power idle state for a substantially long time interval (e.g., hours, days, or weeks), and enables the low-power receiving network devices to independent decide when to awake to an active state for communications within a future time interval using the offered objective function.

Figure 1B:
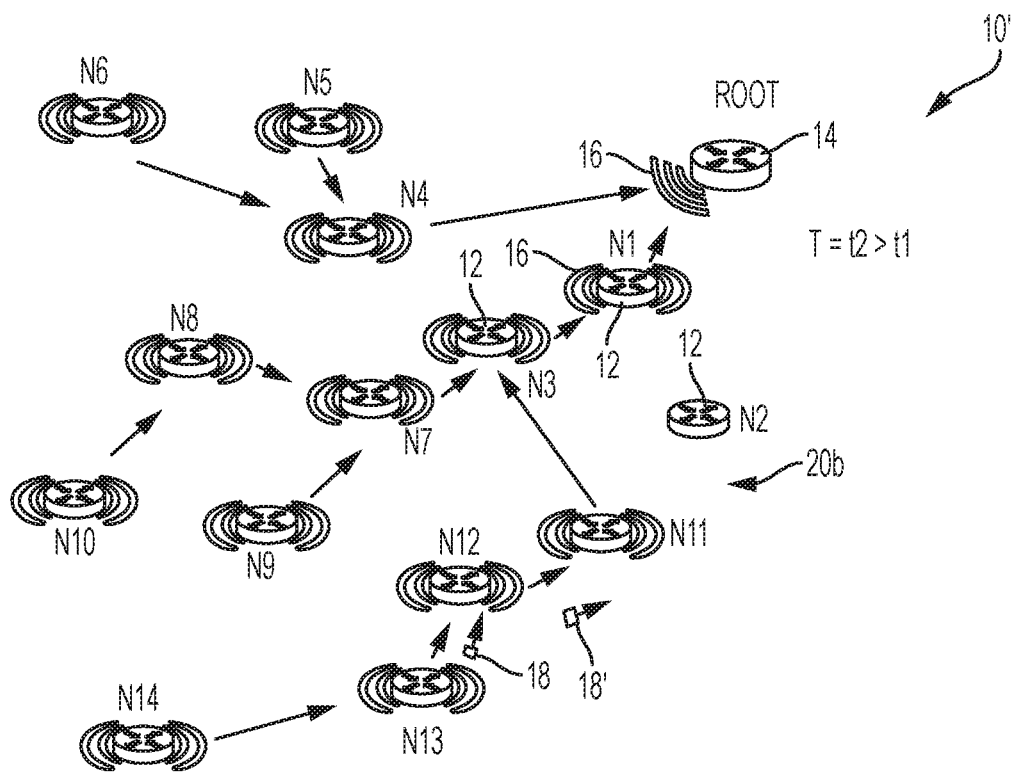
Figure 1C:
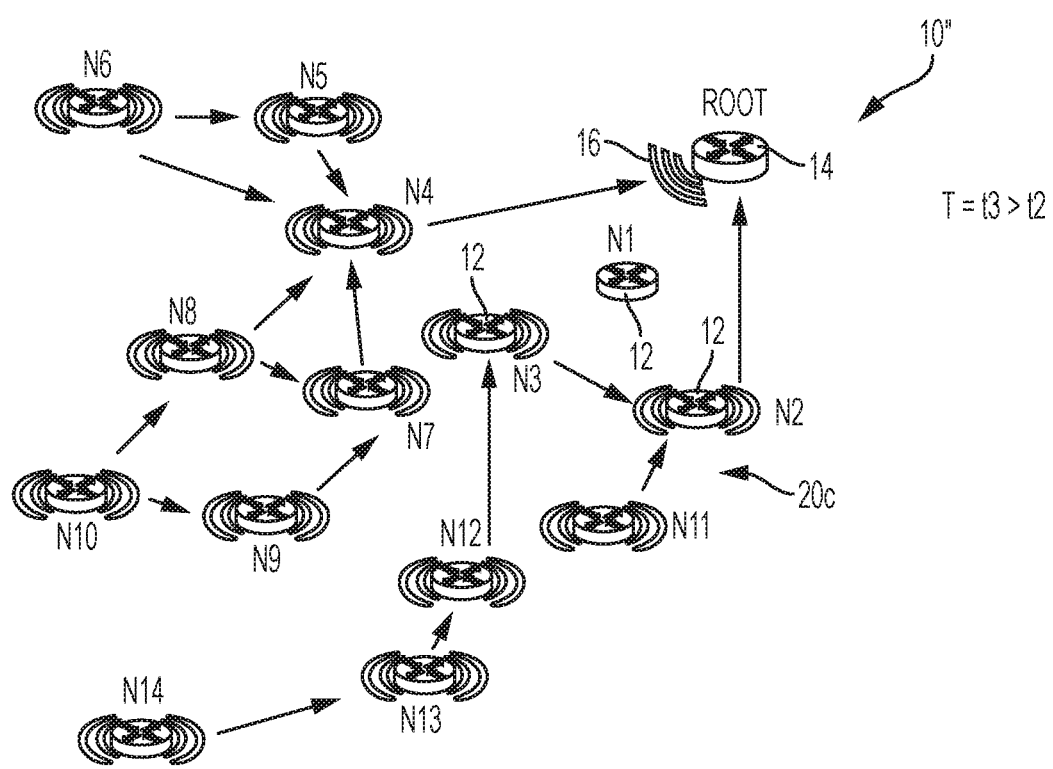

FIGS. 1A-1C illustrate example data networks 10, 10', and 10" having an apparatus 12 and/or 14 configured for generation of a tree-based topology (e.g., 20a of FIG. 1, 20b of FIG. 2, 20c of FIG. 3) that is optimized for a future time instance offered by an advertising network device, according to an example embodiment. The data networks 10, 10', and 10" represent the same data network having respective distinct tree-based topologies 20a, 20b, and 20c at respective time instances t1, t2, and t3, where the time instance T=t2 of FIG. 1B is after the time instance T=t1 of FIG. 1A, and the time instance T=t3 of FIG. 1C is after the time instanceT=t2 of FIG. 1B. Each of the data networks 10, 10' and 10" each comprise network devices (e.g., "N1 through "N14") 12 attached to at least one of another network device 12 or a root network device "ROOT" 14 via wireless data links 16 that form a link layer mesh topology.

Although only the network devices "N1", "N2", and "N3" are labeled with the reference numeral "12" in FIGS. 1A-1C to avoid cluttering in the Figures, it should be apparent that all the network devices "N1" through "N14" are allocated the reference numeral "12" for purposes of the description herein. Further, it should be apparent that all the network devices "N1" through "N14" 12 are configured for establishing wireless data links 16 (illustrated as curved lines radiating from each device 12 or 14), even though only the wireless data links for the network device "N1" 12 and root network device 14 are labeled with the reference numeral "16" to avoid cluttering in the Figures.

Conventional approaches to generating a DODAG topology assume that the DODAG root network device 14 outputs a routing advertisement message (e.g., a RPL DIO message according to RFC 6550, etc.) that specifies the Objective Function (OF) to be currently used by network devices 12 in evaluating whether to attach to the root network device 14 or other neighboring network devices 12. The objective function specified in the routing advertisement message (e.g., an Objective Code Point (OCP) value according to RFC 6550) defines how RPL nodes 12 select and optimize routes within the DODAG topology according to the objective function specified by the root network device. Hence, the RPL nodes 12 in conventional approaches can form the initial tree-based DODAG topology (e.g., 20a of FIG. 1) based on the objective function specified by the root network device 14 at the time of network formation, for example an objective function "OF1" for "maximum network stability" (i.e., minimal movement of network devices such that relatively immobile network devices 12 have a higher rank than those having higher mobility). In other words, once the network devices 12 establish the tree-based topology 20a in response to the objective function specified by the root network device 14 in the routing advertisement message, conventional approaches would maintain the tree-based topology 20a of FIG. 1 using the objective function "OF1" specified by the root network device 14 in the routing advertisement message, regardless of the subsequent needs of the network devices 12. Any prior attempts to reserve network resources for a future event (e.g., according to Resource Reservation Protocol) would be based on an assumed availability of existing network resources within the existing network topology.

According to example embodiments, an advertising network device (12 and/or 14) in a tree-based topology (e.g., 20a of FIG. 1A) can generate and send an offer advertisement message 22 offering an optimized tree-based topology (e.g., 20b of FIG. 1B and/or 20c of FIG. 1C) for use at a future time interval by the child network devices, using an objective function that can be separate and distinct from the original objective function "OF1" specified by the root network device 14 during formation of the initial tree-based topology 20a of FIG. 1A.

As described in further detail below, the advertising network device (12 and/or 14) can identify and select the future time interval and the corresponding objective function for a future tree-based topology (e.g., 20*b*) based on various analytics executed by the advertising network device (12 and/or 14), for example based on evaluation of available (and future) resources based on different received DIO messages, different offer advertisement messages 22 from other advertising network devices, and determined device resource availability describing the capacity of the advertising network device, relative to evaluation of available (and future) resource requests. For example, in one embodiment the advertising network device (12 and/or 14) can be configured for collecting and aggregating various requests messages 18, and execute analytics to identify one or more future time intervals that satisfy the most of the requests 18. Each child network device (e.g., "N12" in FIG. 1A) 12 optionally can output a request message 18 to its "parent" network device (e.g., "N11") in an existing tree-based topology (e.g., 20*a* of FIG. 1), where the request message 18 can request that the network device (e.g., "N11") generates an optimized tree-based topology (e.g., 20*b* of FIG. 1B) for a future use by the child network device (e.g., "N12").

Hence, the advertising network device (12 and/or 14) can execute analytics to identify and select the future time interval and the corresponding objective function for a future tree-based topology based on received messages from other network device 12 and/or 14, and/or based on programmed selection based on execution of an executable resource by the advertising network device (e.g., a heuristic topology scheduler). Hence, the example embodiments enable coordinated negotiation between network devices for future topologies at future time intervals.

Although only a subset of the devices 12 and 14 in the Figures are illustrated as outputting an offer advertisement message 22 to avoid cluttering in the Figures, it should be apparent that all the network devices "N1" through "N14" 12 and the root network device 14 can output a corresponding offer advertisement message 22. Further, it should be apparent that all the network devices "N1" through "N14" 12 can have one or more attachments (illustrated in FIGS. 1A-1C as arrows), where each attachment is used to illustrate an optimized next-hop path chosen for an identifiable objective function, described below.

Figure 2:
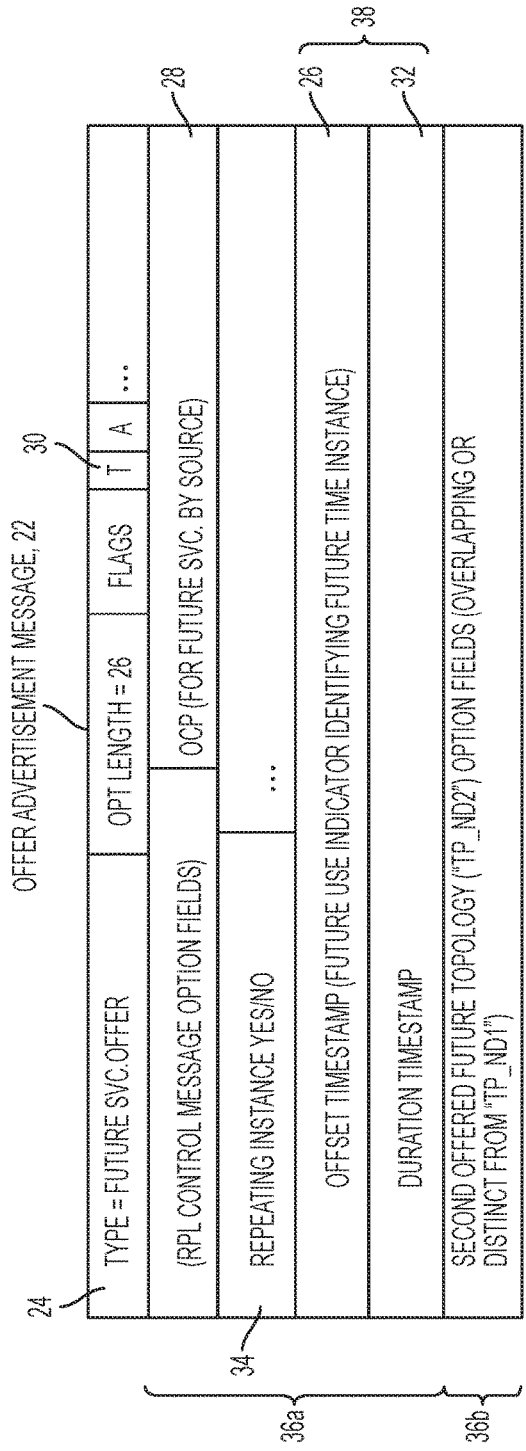
FIG. 2 illustrates an example advertisement message including attributes describing a future time instance offered by the apparatus of FIGS. 1A-1C for optimizing a tree-based topology for the future time instance according to an identified objective function, according to an example embodiment.

FIG. 2 illustrates an example offer advertisement message 22 including attributes describing one or more "offers" 36 (e.g., 36*a*, 36*b*) of a future topology at a future time interval (e.g., starting at time instance t2 or t3) for optimizing a tree-based topology (e.g., 20*b*, 20*c*) for the future time instance according to an identified objective function, according to an example embodiment. The offer advertisement message 22, implemented for example in accordance with DODAG configuration options based on Section 6.7 of RFC 6550, can include a future service offer indicator 24 as a prescribed option type (i.e., the "type" being a future service offer).

The offer advertisement message 22 can include, for each "offer" 36, a future time interval (e.g., "TI_ND" of FIG. 4, "TI_NDi" of FIG. 5) 38 comprising a future use indicator 26 identifying the future time instance (e.g., as an offset value subsequent to an epochal start time of the data network 10, or as a future absolute time value), and a future duration 32 relative to the future use indicator 26. The offer advertisement message 22 also can include an advertising network device-selected objective function indicator (e.g., "OF_ND" in FIG. 4, "OF_NDi" in FIG. 5) 28 that identifies the advertising network device-selected objective function 28 that will be used for generating the optimized tree-based topology (e.g., "TP_ND1" 20*b*, "TP_ND2" 20*c*) at the time specified in the future use indicator 26. The offer advertisement message 22 also can include a time-based flag "T" 30 identifying that the identified objective function (OF) specified in the child-selected objective function indicator 28 is to be used for a future time specified in the future use indicator 26, and/or a repeating instance attribute 34 identifying repeating instances (e.g., every hour, every twelve hours, every day, etc.) following the future time instance 26. The offer advertisement message 22 can specify other topology-related routing metrics as described in RFC 6551.

Hence, an advertising network device (e.g., "ROOT") 14 at epochal time "T=t1" in FIG. 1A can multicast an offer advertisement message 22 that is detected by the network devices "N1", "N2", and "N4" 12 specifying the offer 36*a* for generation of the optimized tree-based topology 20*b* of FIG. 1B according to a distinct objective function (e.g., "OF_R1"), and the offer advertisement message 22 further specifying the offer 36*b* for generation of the optimized tree-based topology of FIG. 1C according to the distinct objective function (e.g., "OF_R2"). Each of the network devices "N1", "N2", and "N4" 12 can respond to the received offer advertisement message 22 by executing analytics to determine their respective resources versus pending requests 18 from child network devices, and generate and multicast their own corresponding offer advertisement message 22. As described in further detail below with respect to FIG. 5, the network device "N2" can generate a corresponding offer advertisement message 22 that excludes availability during time "t2" in FIG. 1B (due to the network device "N2" deciding to enter a "sleep" stage) but offers availability during time "t3" in FIG. 1C, whereas the network device "N1" can generate a corresponding offer advertisement message 22 that offers availability during time "t2" in FIG. 1B but excludes availability during time "t3" in FIG. 1C. Hence, other network devices can schedule based on the determined availability of different future topologies 36 at specified time intervals 38 according to specified objective functions 28.

Figure 3:
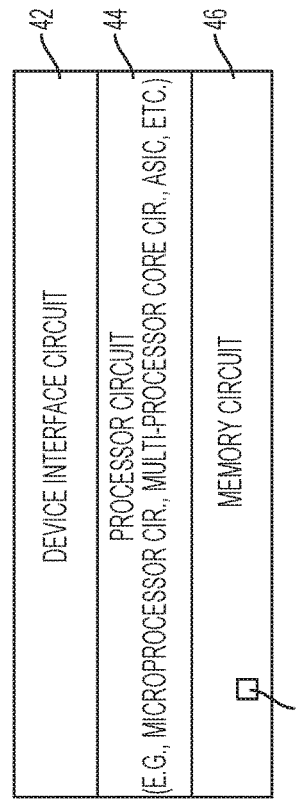
FIG. 3 illustrates an example implementation of any one of the network devices of FIG. 1, according to an example embodiment.

FIG. 3 illustrates an example implementation of any one of the devices 12 and/or 14 of FIGS. 1A-1C, according to an example embodiment. Each apparatus 12 and 14 is a physical machine (i.e., a hardware device) configured for implementing network communications with other physical machines 12 or 14 in the data network 10 or via wired or wireless data links, illustrated in FIGS. 1A-1C as wireless data links 16 that form a wireless mesh network. The data network 10 can provide communications to a local area network (LAN) and/or a wide area network (WAN) (e.g., the Internet), for example based on a gateway device (not shown) in communication with the root network device 14. The term "configured for" or "configured to" as used herein with respect to a specified operation refers to a device and/or machine that is physically constructed and arranged to perform the specified operation. Hence, each apparatus 12 or 14 is a network-enabled machine implementing network communications via the data network 10.

Each apparatus 12 and/or 14 can include a device interface circuit 42, a processor circuit 44, and a memory circuit 46. The device interface circuit 42 can include one or more distinct physical layer transceivers for communication with any one of the other devices 12 and/or 14; the device interface circuit 42 also can include an IEEE based Ethernet transceiver for communications with the devices of FIGS. 1A-1C via any type of data link (e.g., a wired or wireless link, an optical link, etc.) 16. The processor circuit 44 can be configured for executing any of the operations described herein, and the memory circuit 46 can be configured for storing any data or data packets as described herein.

Any of the disclosed circuits of the devices 12 and/or 14 (including the device interface circuit 42, the processor circuit 44, the memory circuit 46, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 46) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 46 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 46 can be implemented dynamically by the processor circuit 44, for example based on memory address assignment and partitioning executed by the processor circuit 44.

Figure 4:
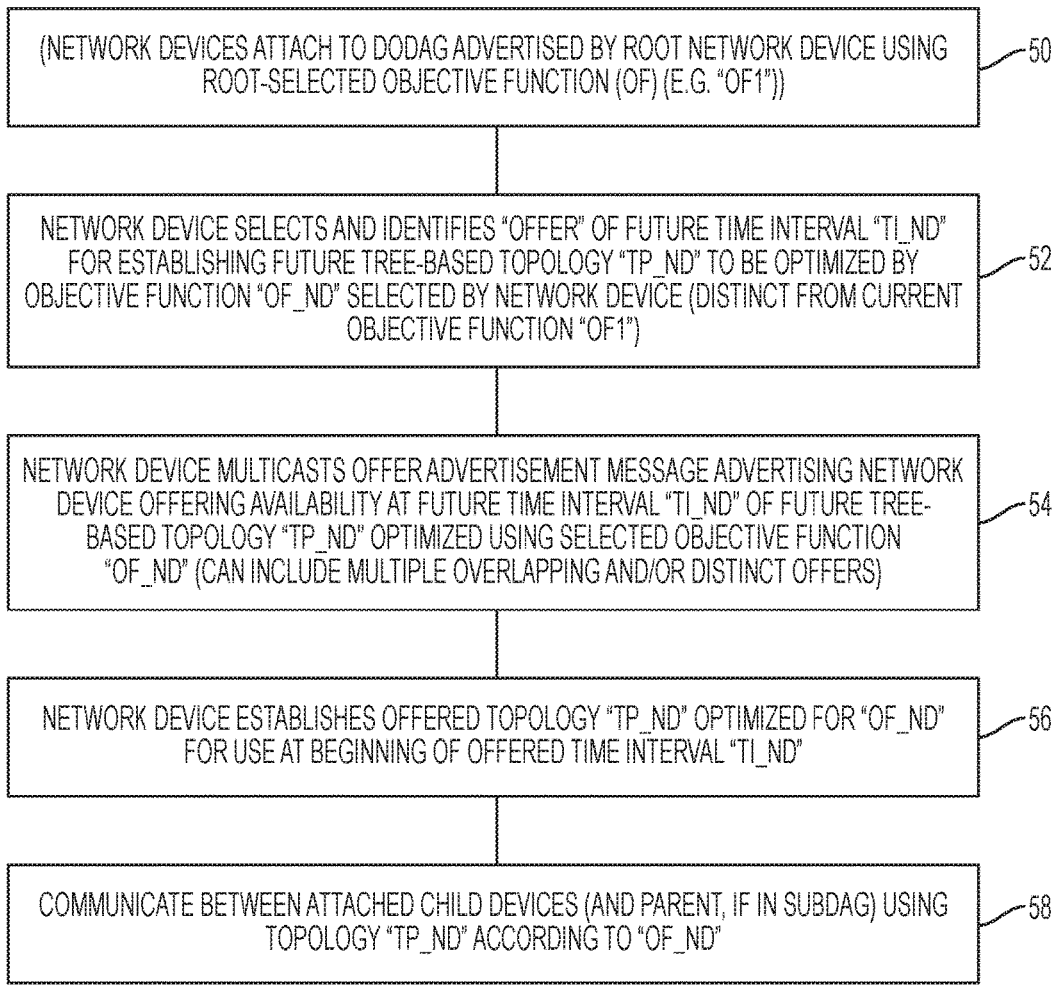
FIG. 4 illustrates an example method by the apparatus of FIG. 1 configured for advertising and generating a tree-based topology that is optimized for a future time instance selected by the apparatus, according to an example embodiment.

FIG. 4 illustrates an example method by an apparatus 12 and/or 14 of FIGS. 1A-1C, also referred to herein as an advertising network device, for generation of a tree-based topology (e.g., 20b, 20c) that is optimized for a future time instance offered by the advertising network device, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4, the device interface circuit 42 of each network device 12 is configured for detecting and receiving, in operation 50, one or more routing advertisement messages (e.g., a DIO) from the root network device 14 and/or one or more of the network devices 12, for establishment of the tree-based topology 20a according to RFC 6550. FIG. 1A illustrates the network device "N1" 12 attaching to the root network device 14 in response to a received routing advertisement message, for formation of the tree-based topology 20a according to the objective function "OH" specified in the routing advertisement message. FIG. 1A also illustrates other network devices 12 attaching in response to receiving updated routing advertisement messages, for example network devices "N6" and "N14" 12 attaching in response to receiving updated routing advertisement messages from the respective attached network devices "N4" and "N13" 12. Hence, each network device 12 in FIG. 1A at the time instance "T=t1" can initially attach to the DAG 20a rooted by the root network device 14 according to the objective function "OH". It is assumed herein each child network device can maintain its attachment to at least one "parent" network device throughout the time described herein (i.e., from time t1 through time t3) to enable the "parent" network device to execute the optimization operations described herein; as apparent from the foregoing, if a parent network device becomes unavailable, the child network device can find a new parent using existing RPL techniques.

The processor circuit 44 of a network device (e.g., the Root 14 or a network device 12) is configured for selecting in operation 52 an identifying an "offer" 36a of a future time interval (e.g., "TI_ND") 38 for establishing a future tree-based topology (e.g., "TP_ND1" 20b) that is optimized by a corresponding objective function (e.g., "OF_ND1") 28 selected by the network device. As described in further detail below, the network device 12 and/or 14 can select and identify the offer 36 and its associated parameters 28, 34, 38, based on other received messages, heuristics, etc., described in further detail below.

The processor circuit 44 of the network device (e.g., the Root 14 or the network device 12) in operation 54 insert one or more offers (e.g., 36a, 36b of FIG. 2) into an offer advertisement message 22, and can cause the device interface circuit 42 to multicast the offer advertisement message 22. As described in further detail below, the receiving network devices (e.g., "N1", "N2", and "N4") can update the received offer advertisement message 22, and output an updated offer advertisement message 22 based on the capabilities of the receiving network devices, for propagation throughout the tree-based network topology 20a.

Figure 6:
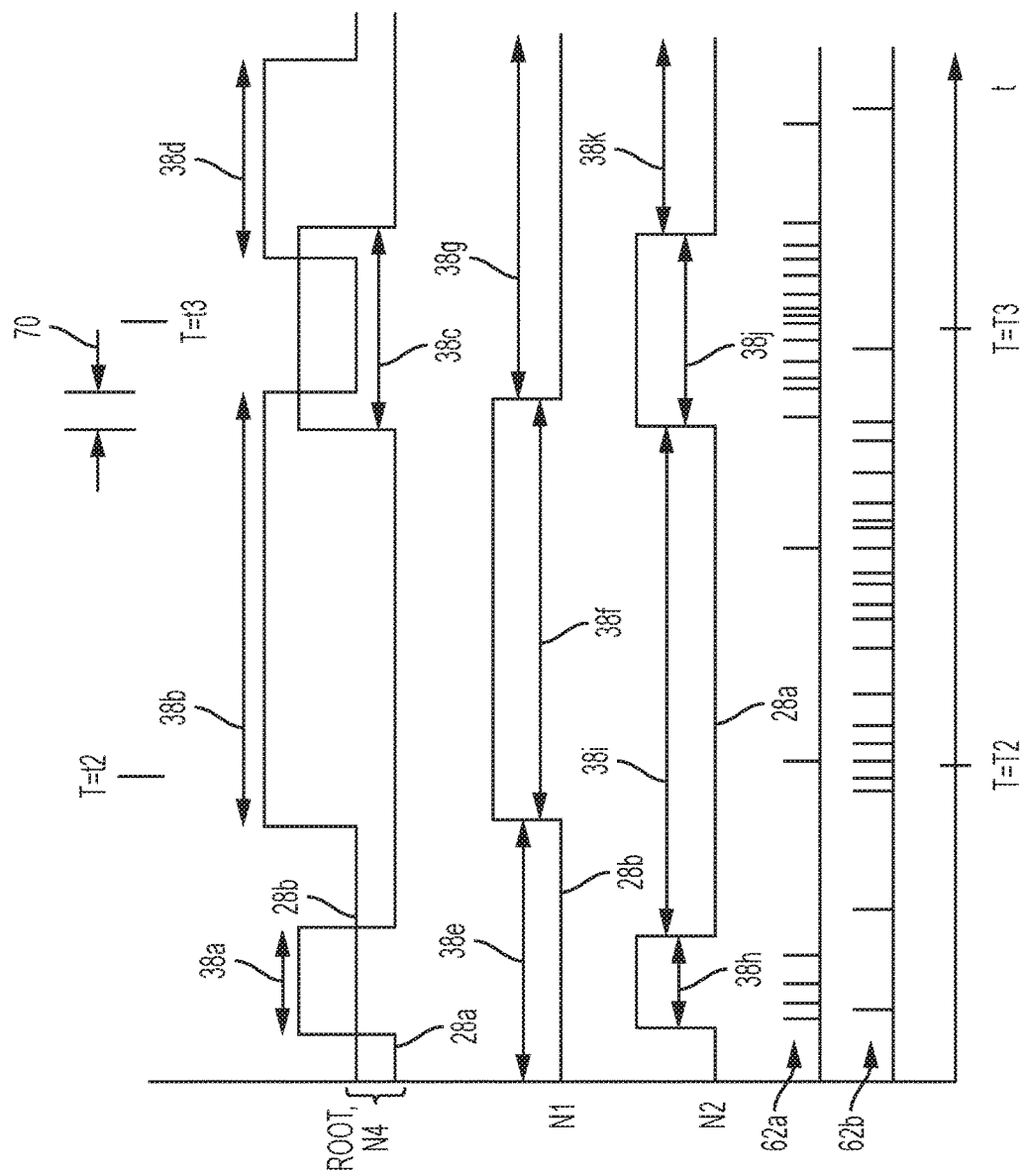
FIG. 6 illustrates an example timing diagram implementing the future tree-based topologies by the network devices, according to an example embodiment.

The processor circuit 44 of the root network device 14 in operation 56 can establish the offered topology as specified in the offer 36a of the offer advertisement message 22, enabling other network devices to attach to the root network device 14 at any time during the corresponding offered interval (e.g., "TI_ND") (e.g., 38a, 38c of FIG. 6), for communication in operation 58 as child network devices according to the offered objective function (e.g., "OF_ND1=OF_R1") (28a of FIG. 6). The processor circuit 44 of the root network device 14 in operation 56 also can establish the topology offered in the offer 36b, enabling the other network devices to attach to the root network device 14 at any time during the corresponding offered interval (e.g., 38b, 38d of FIG. 6).

Figure 5:
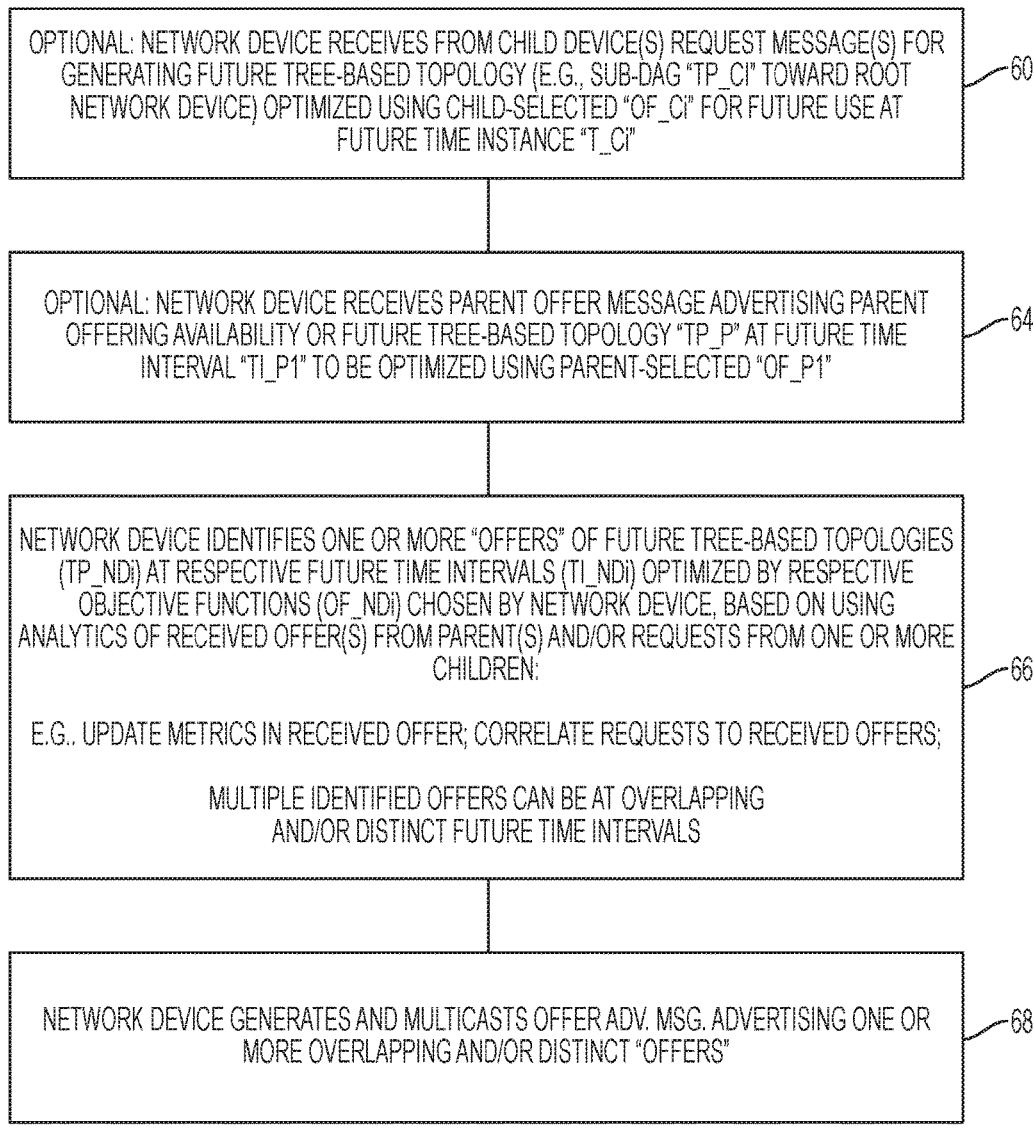
FIG. 5 illustrates example variations in the method of FIG. 4 of advertising and generating the tree-based topology, according to an example embodiment.

FIG. 5 illustrates in further detail the example method of FIG. 4, where the device interface circuit 42 of a network device (e.g., the Root 14, and/or network devices "N1", "N2", and/or "N4" 12) in operation 60 can receive different child device request messages 18 for generating a future tree-based topology for at least a Sub-DAG in which a child network device is attached within the tree-based topology 20a. In particular, a child network device (e.g., "N6", "N9", "N12", etc.) 12 in FIG. 1A can generate an output a request message 18 specifying generation at a future time instance "T_Ci" (62 of FIG. 5) a particular tree-based topology "TP_Ci" according to a child-selected objective function "OF_Ci; intermediate parent network devices 12 can forward a request message 18 "up the tree" toward the root network device 14, and/or respond by generating a corresponding offer advertisement message 22 as described in operations 52 and 54, and described in further detail below.

The device interface circuit 42 of a network device (e.g., "N1" through "N14") 12 in operation 64 can receive the offer advertisement message 22 generated by the root network device 14 as described above. As illustrated in FIG. 2, the offer advertisement message 22 can specify a first offer 36a for generating the topology 20b of FIG. 1B according to a corresponding objective function "OF_R1" (e.g., optimized for high bandwidth) (28a of FIG. 6), and a second offer 36b for generating the topology 20c of FIG. 1C according to a corresponding objective function "OF_R2" (e.g., optimized for low latency) (28b of FIG. 6).

FIG. 6 illustrates a timing diagram, where the offer advertisement message 22 output by the root 14 specifying the first offer 36a is illustrated by availability of the topology 20b according to the objective function "OF_R1" 28a during the offered time intervals 38a, and 38c, and the second offer 36b is illustrated by availability of the topology 26c according to the objective function OF_R2 28b during the offered time intervals 38b and 38d. The reference numeral 62a refers to time instances (specified in respective requests 18 accumulated by the root 14 and network devices "N1" and "NT" 12) for the objective function 28a, and the reference numeral 62b refers to time instances (specified in the same or different requests) for the objective function 28b. As illustrated in FIG. 5, the root network device 14 can provide time intervals 38b, 38c for distinct objective functions 28b, 28a, where the time intervals 38b and 38c have an overlapping common time interval 70 that enables other network devices to use any of the concurrently-offered topologies optimized according to the objective function 28a or 28b.

In response to the device interface circuit 42 receiving the request messages 18 and/or an offer advertisement message 22 from a parent (e.g., the root 14) via the tree-based topology 20a, the processor circuit 44 of a network device (e.g., "N1", "N2", "N4") 12 in operation 66 can select and identify one or more future tree-based topologies to be offered by the network device 12 at respective future time intervals 38, optimized by respective objective functions 28 chosen by the network device, based on executing analytics on the received request messages 18 and/or offer advertisement messages.

For example, the processor circuit 44 of the network device "N1" 12 in operation 66 can decide (with respect to the received requests 18 for instances 62b) that it has a hardware optimization for the optimization 28b during time interval 38f, but needs to enter an idle (sleep) state during the time intervals 38e and 38g; hence, the processor circuit 44 of the network device "N1" 12 in operation 66 can generate its own offer advertisement message 22 offering availability of the tree-based topology 20b optimized at the future time interval 38f for the identified objective function 28b, and multicast in operation 68. Hence, other network devices can attach to the network device "N1" 12 at any time during the future time interval 38f (illustrated in FIG. 1B during time instance T=t2") for communications via the tree-based topology 20b optimized according to the objective function 28b.

The network device "N4" 12, in response to detecting in operation 64 the offer advertisement message 22 by the root network device 14 and the corresponding updated offer advertisement message 22 by network device "N1" (and requests 18 in operation 60), can proactively determine that the network device "N1" is going to enter an idle state at time interval 38f, and in response the network device "N4" 12 can attach directly to the root 14, as illustrated in FIG. 1B, for communications during the time intervals 38b, 38c, and 38d. The network device "N4" in operation 66 can update the offer advertisement message 22 received from the root network device with its corresponding metrics, and output in operation 68 an updated offer advertisement message 22 specifying the offers 36a and 36b (updated with the rank metrics, etc. via the network device "N4"), including the time intervals 38a, 38b, 38c, and 38d (including the overlapping portion 70).

The network device "N2", in response to detecting in operation 60 the requests 18 specifying the future instances 62a and detecting in operation 64 the offer advertisement message 22 by the root network device 14, can decide (with respect to the received requests 18 for instances 62a) that it can offer a hardware optimization for the optimization 28a during time intervals 38h and 38j, but needs to enter an idle (sleep) state during the time intervals 38i and 38k; hence, the processor circuit 44 of the network device "N2" 12 in operation 66 can generate its own offer advertisement message 22 offering availability of the tree-based topology 20a optimized at the future time interval 38h and 38j for the identified objective function 28a, and multicast the updated offer advertisement message 22 in operation 68. Hence, other network devices can attach to the network device "N2" 12 at any time during the future time interval 38h or the future time interval 38j (illustrated in FIG. 1C during time instance T=t3") for communications via the tree-based topology 20c optimized according to the objective function 28a.

According to example embodiments, a time-based optimization can be implemented in a tree-based network, where a child network device can request generation of an optimized tree-based topology, according to a child-selected optimization function, for deployment at a future time instance for the future use by the child network device, and parent network devices can generate offer advertisement messages that offer availability of future tree-based topologies that are optimized at future time intervals for an identified objective function. The example embodiments enable the child-initiated requests to be propagated upward toward a root of the tree-based network topology, and enable the parent-initiated offer advertisement messages to be propagated downward away from the root of the tree-based network topology, enabling the network devices to proactively and independently select when to attach to the topology at any time within a specified future time interval.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
identifying, by a network device in a data network having a current tree-based topology, a future time interval for establishment of a corresponding future tree-based topology in the data network and that is to be optimized according to an identified objective function, the future tree-based topology and corresponding identified objective function distinct and different from the current tree-based topology that is optimized according to a corresponding current objective function; and
generating and outputting into the data network via the current tree-based topology, by the network device, a message advertising the network device offering availability of the future tree-based topology optimized at the future time interval for the identified objective function, causing other network devices to attach to the network device during the future time interval for communications via the future tree-based topology that is optimized according to the identified objective function.

2. The method of claim 1, wherein the generating includes specifying, in the message, the future time interval and the corresponding identified objective function.

3. The method of claim 1, further comprising receiving a parent message from a parent network device specifying the future time interval and the corresponding identified objective function, the generating including generating the message based on updating optimization metrics associated with a corresponding positioning of the network device within the future tree-based topology.

4. The method of claim 1, further comprising:
establishing, at a beginning of the future time interval, the future tree-based topology according to the identified objective function; and
communicating with the other network devices having attached to the network device during the future time interval, according to the identified objective function.

5. The method of claim 1, further comprising:
second identifying, by the network device, a second future time interval for establishment of a corresponding second future tree-based topology that is to be optimized according to a second identified objective function, the second future tree-based topology and corresponding second identified objective function distinct from the current tree-based topology optimized according to the current objective function, and distinct from the future tree-based topology optimized according to the identified objective function;
the generating including inserting, into the message, parameters advertising the network device offering availability of the second future tree-based topology optimized at the second future time interval for the second identified objective function.

6. The method of claim 5, wherein the future time interval and the second future time interval each share an overlapping common time interval, enabling the other network devices to utilize any one of the future tree-based topology or the second future tree-based topology during the overlapping common time interval.

7. The method of claim 1, further comprising:
receiving at least one request message for generating the future tree-based topology according to the identified objective function at a future time instance specified in the request message;
wherein the identifying includes identifying the future time interval based on the at least one request message.

8. An apparatus comprising:
a processor circuit configured for identifying a future time interval for establishment of a corresponding future tree-based topology in a data network and that is to be optimized according to an identified objective function, the future tree-based topology and corresponding identified objective function distinct and different from a current tree-based topology of the data network and that is optimized according to a corresponding current objective function, the processor circuit further configured for generating a message advertising the apparatus offering availability of the future tree-based topology optimized at the future time interval for the identified objective function; and
a device interface circuit configured for outputting the message into the data network via the current tree-based topology, the message causing other network devices to attach to the apparatus during the future time interval for communications via the future tree-based topology that is optimized according to the identified objective function.

9. The apparatus of claim 8, wherein the processor circuit is configured for specifying, in the message, the future time interval and the corresponding identified objective function.

10. The apparatus of claim 8, wherein:
the device interface circuit is configured for receiving a parent message from a parent network device specifying the future time interval and the corresponding identified objective function;
the processor circuit configured for generating the message based on updating optimization metrics associated with a corresponding positioning of the apparatus within the future tree-based topology.

11. The apparatus of claim 8, wherein:
the processor circuit is configured for establishing, at a beginning of the future time interval, the future tree-based topology according to the identified objective function;
the device interface circuit is configured for communicating with the other network devices having attached to the apparatus during the future time interval, according to the identified objective function.

12. The apparatus of claim 8, wherein:
the processor circuit is configured for identifying a second future time interval for establishment of a corresponding second future tree-based topology that is to be optimized according to a second identified objective function, the second future tree-based topology and corresponding second identified objective function distinct from the current tree-based topology optimized according to the current objective function, and distinct from the future tree-based topology optimized according to the identified objective function;

the processor circuit further configured for inserting, into the message, parameters advertising the apparatus offering availability of the second future tree-based topology optimized at the second future time interval for the second identified objective function.

13. The apparatus of claim 12, wherein the future time interval and the second future time interval each share an overlapping common time interval, enabling the other network devices to utilize any one of the future tree-based topology or the second future tree-based topology during the overlapping common time interval.

14. The apparatus of claim 8, wherein:
the device interface circuit is configured for receiving at least one request message for generating the future tree-based topology according to the identified objective function at a future time instance specified in the request message;
the processor circuit is configured for identifying the future time interval based on the at least one request message.

15. One or more non-transitory tangible media encoded with logic for execution by a machine and when executed by the machine operable for:
identifying, by the machine implemented as a network device in a data network having a current tree-based topology, a future time interval for establishment of a corresponding future tree-based topology in the data network and that is to be optimized according to an identified objective function, the future tree-based topology and corresponding identified objective function distinct and different from the current tree-based topology that is optimized according to a corresponding current objective function; and
generating and outputting into the data network via the current tree-based topology, by the network device, a message advertising the network device offering availability of the future tree-based topology optimized at the future time interval for the identified objective function, causing other network devices to attach to the network device during the future time interval for communications via the future tree-based topology that is optimized according to the identified objective function.

16. The one or more non-transitory tangible media of claim 15, wherein the generating includes specifying, in the message, the future time interval and the corresponding identified objective function.

17. The one or more non-transitory tangible media of claim 15, further operable for receiving a parent message from a parent network device specifying the future time interval and the corresponding identified objective function, the generating including generating the message based on updating optimization metrics associated with a corresponding positioning of the network device within the future tree-based topology.

18. The one or more non-transitory tangible media of claim 15, further operable for:
establishing, at a beginning of the future time interval, the future tree-based topology according to the identified objective function; and
communicating with the other network devices having attached to the network device during the future time interval, according to the identified objective function.

19. The one or more non-transitory tangible media of claim 15, further operable for:
second identifying, by the network device, a second future time interval for establishment of a corresponding second future tree-based topology that is to be optimized according to a second identified objective function, the second future tree-based topology and corresponding second identified objective function distinct from the current tree-based topology optimized according to the current objective function, and distinct from the future tree-based topology optimized according to the identified objective function;
the generating including inserting, into the message, parameters advertising the network device offering availability of the second future tree-based topology optimized at the second future time interval for the second identified objective function.

20. The one or more non-transitory tangible media of claim 15, further operable for:
receiving at least one request message for generating the future tree-based topology according to the identified objective function at a future time instance specified in the request message;
wherein the identifying includes identifying the future time interval based on the at least one request message.

* * * * *